United States Patent
Speltz et al.

(10) Patent No.: US 8,988,602 B2
(45) Date of Patent: Mar. 24, 2015

(54) CAMERA VOICE COIL MOTOR WITH RESILIENT STOP

(71) Applicant: Apple, Inc., Cupertino, CA (US)

(72) Inventors: Alex Speltz, San Francisco, CA (US);
Douglas Stuart Brodie, Los Gatos, CA (US); Aurelien Hubert, Saratoga, CA (US); Lee Hooton, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 13/836,088

(22) Filed: Mar. 15, 2013

(65) Prior Publication Data
US 2014/0192251 A1   Jul. 10, 2014

Related U.S. Application Data

(60) Provisional application No. 61/750,725, filed on Jan. 9, 2013.

(51) Int. Cl.
*H04N 5/225* (2006.01)

(52) U.S. Cl.
CPC ............ *H04N 5/2254* (2013.01); *H04N 5/2257* (2013.01)
USPC .......................................... 348/374; 348/340

(58) Field of Classification Search
USPC .................. 348/335, 340, 373–375
See application file for complete search history.

(56) References Cited

U.S. PATENT DOCUMENTS

| | | | |
|---|---|---|---|
| 4,468,016 A | 8/1984 | Pineau | |
| 7,974,528 B2 * | 7/2011 | Chou | 348/208.11 |
| 2005/0190283 A1 * | 9/2005 | Ish-Shalom et al. | 348/340 |
| 2008/0266683 A1 * | 10/2008 | Gao | 359/825 |
| 2009/0141373 A1 * | 6/2009 | Tang | 359/819 |
| 2010/0046099 A1 * | 2/2010 | Liao | 359/824 |
| 2011/0235196 A1 | 9/2011 | Ke | |
| 2012/0091827 A1 * | 4/2012 | Chiang | 310/12.16 |
| 2012/0120512 A1 * | 5/2012 | Wade et al. | 359/824 |

* cited by examiner

*Primary Examiner* — Gevell Selby
(74) *Attorney, Agent, or Firm* — Blakely, Sokoloff, Taylor & Zafman LLP

(57) ABSTRACT

A camera module includes a body having recesses in a first datum surface. A filleted edge may join the recesses to the first datum surface. An image sensor is coupled to the body at a known distance from the first datum surface. A movable lens mechanism includes a fixed portion and a movable portion. The fixed portion is coupled to the body. The movable portion includes a lens assembly and protrusions arranged to fit within the recesses in the first datum surface and to define a second datum surface. A resilient stop plate covers the recesses in the first datum surface with an elastic sheet material. A spring may hold the protrusions in contact with the resilient stop plate when the movable lens mechanism is unpowered. The resilient stop plate may include a rigid support plate coupled to the body by heat staking. The elastic sheet material may be viscoelastic.

14 Claims, 4 Drawing Sheets

CAMERA VOICE COIL MOTOR WITH RESILIENT STOP

CROSS REFERENCE TO RELATED APPLICATIONS

This application claims the benefit pursuant to 35 U.S.C. 119(e) of U.S. Provisional Application No. 61/750,725, filed Jan. 9, 2013, which application is specifically incorporated herein, in its entirety, by reference.

BACKGROUND

1. Field

Embodiments of the invention relate to the field of camera lens modules; and more specifically, to a camera module for use in portable digital devices.

2. Background

Many portable electronic devices, such as mobile cellular telephones, include a digital camera. The lenses for such cameras must be compact to fit within the case of the portable electronic device. At the same time there is a desire to provide an increasingly high quality camera function in these devices. To provide a higher quality image, some cameras found in portable electronic devices provide an autofocus feature.

The lens may be mounted in a mechanism that moves the lens along its optical axis to change the distance between the lens and the image sensor. This changes the focal distance of the camera and allows a sharper image to be obtained for subjects over a greater range of distances from the camera. One such lens moving mechanism for moving a lens is a voice coil motor (VCM). Typically a lens is inserted into a lens moving mechanism, such as a VCM, and an image sensor is then assembled to the lens moving mechanism to provide a camera lens module.

The lens moving mechanism generally includes a plurality of datum surfaces at an end of the mechanism closest to the image sensor. The datum surfaces of the lens moving mechanism may contact a similar plurality of datum surfaces on a fixed portion of the camera module body at a known distance from the surface of an image sensor where the lens focuses distant objects on the image sensor. This provides a reference position for an autofocus mechanism that moves the lens into focus for near objects using the VCM. The tolerance for the positioning provided by the datums is around 50 microns (0.05 millimeters, 0.002 inches). The parts are typically formed from a hard plastic to provide the necessary dimensional stability for the datums.

The lens moving mechanism is generally held with the datums in contact by a spring when the VCM is unpowered. The VCM moves the lens through a range of motion against the spring force when the VCM is powered. It is desirable to minimize the force that the VCM must provide to overcome the force provided by the spring. Generally the spring is chosen to be just sufficient to hold the datums in contact when the camera is pointed down. In other words, the spring is just sufficient to support the weight of the moving portion of the VCM, including the lens, against the force of gravity. As result mechanical shocks and vibrations can move the lens moving mechanism when the VCM is unpowered sufficiently to cause the datum surfaces of the lens moving mechanism to separate and then make contact. This contact may produce an audible sound, such as a click. If the camera module is used in a mobile device, such as a cellular telephone, the clicking of the datum surfaces due to mechanical shocks may be disturbing when the mobile device is close to an ear of a user.

It would be desirable to provide a datum surface for a camera module that reduces the sound created when a mechanical shock causes datum surfaces to contact one another while providing the necessary dimensional tolerance and stability.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

This disclosure describes methods for constraining a bottom side assembly lens barrel from mechanical interference with underlying structures within a camera module system.

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
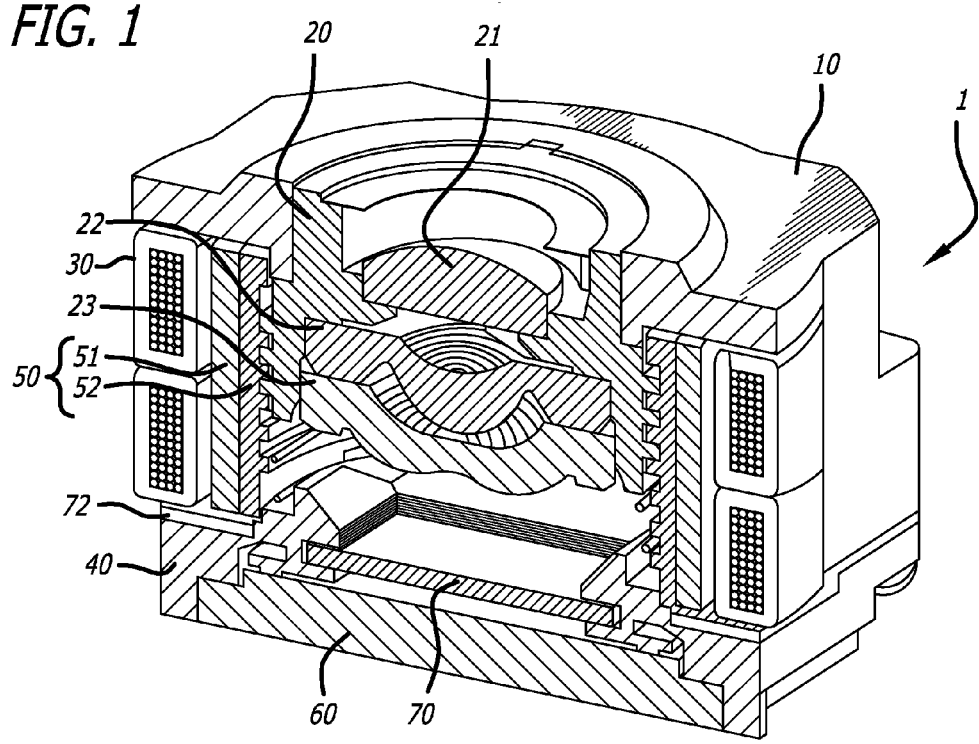
FIG. 1 is a pictorial view of a camera module that has been sectioned along a diameter to allow the internal construction to be seen.

FIG. 1 shows a pictorial view of a camera module 1 that has been sectioned along a diameter to allow the internal construction to be seen.

Figure 2:
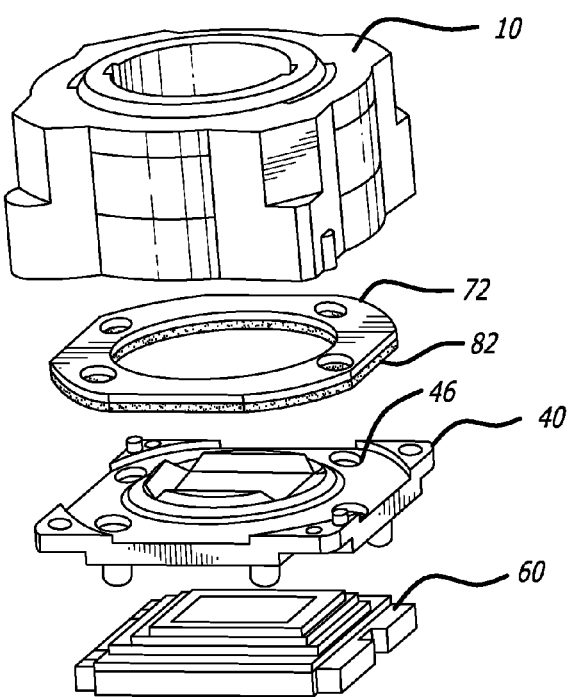
FIG. 2 is a pictorial view of the camera module of FIG. 1 in an exploded configuration to allow certain additional details of the internal construction to be seen.

FIG. 2 shows a pictorial view of the camera module 1 of FIG. 1 in an exploded configuration to allow certain additional details of the internal construction to be seen.

A body 40 has a first datum surface 44 with a plurality of recesses 46 in the first datum surface. An image sensor 60 is coupled to the body 40 at a known distance from the first datum surface 44.

A lens assembly includes a lens barrel 20 that supports one or more lenses 21, 22, 23. The lens barrel is coupled to the moving portion 51, 52 of a lens moving mechanism 10, 30, 50.

A movable lens mechanism has a fixed portion 10, 30 and a movable portion 20, 50. The fixed portion 10, 30 is coupled to the body 40. The movable portion 20, 50 includes a lens assembly 20 that includes one or more lenses 21, 22, 23 and a plurality of protrusions arranged to fit within the like plurality of recesses 46 in the first datum surface 44 and to define a second datum surface. A resilient stop plate 70 includes an elastic sheet material that covers the first datum surface 44 and the plurality of recesses 46 in the first datum surface.

Figure 3:
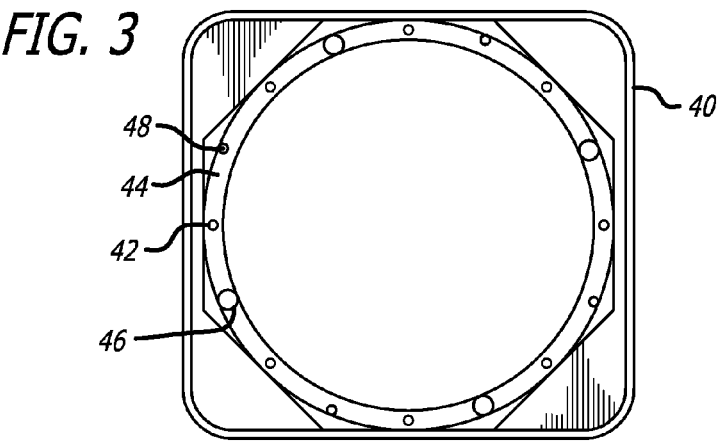
FIG. 3 is a plan view of the body of the camera module of FIG. 1.

FIG. 3 is a plan view of the body 40 showing the first datum surface 44 and the plurality of recesses 46.

Figure 4:
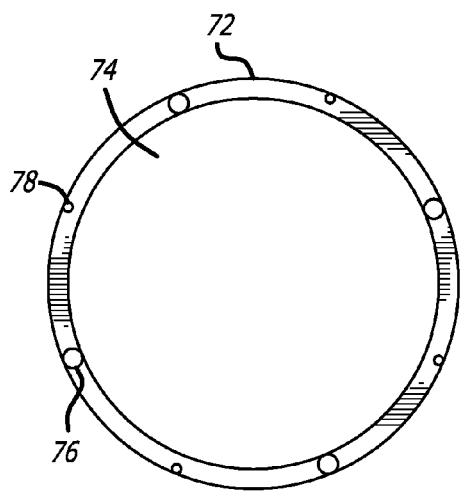
FIG. 4 is a plan view of a rigid support plate that may be part of a resilient stop plate.

FIG. 4 is a plan view of a rigid support plate 72 that may be part of the resilient stop plate 70. The rigid support plate 72 may be formed of sheet metal. The rigid support plate 72 has a central opening 74 that provides an optical path between the camera lens 20 on a first side of the support plate and an image sensor 60 on an opposite side of the support plate. A plurality of peripheral openings 76 are arranged to receive the plurality of protrusions on the lens assembly.

Figure 5:
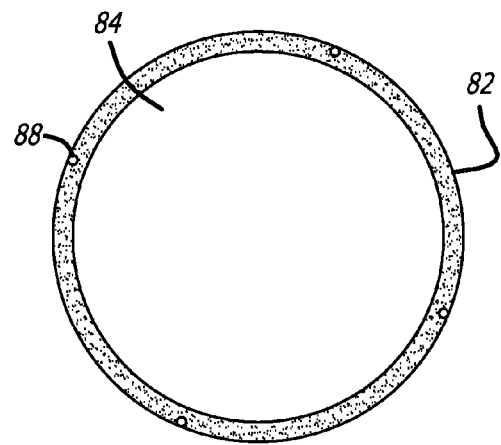
FIG. 5 is a plan view of an elastic sheet material that covers the rigid support plate of FIG. 4.

FIG. 5 is a plan view of an elastic sheet material 82 that covers the plurality of peripheral openings 76 in the support plate 72. The elastic sheet material may be coupled to the support plate, such as being adhesively attached, with a first surface of the elastic sheet material in contact with a first surface of the support plate. The portion of the elastic sheet material 82 that would cover the central opening of the support plate may be cut away after the elastic sheet material is coupled to the support plate. Alternatively, the elastic sheet material may be co-molded with the support plate and may cover one or both sides of the support plate, completely or in selected areas of the support plate.

Figure 6:
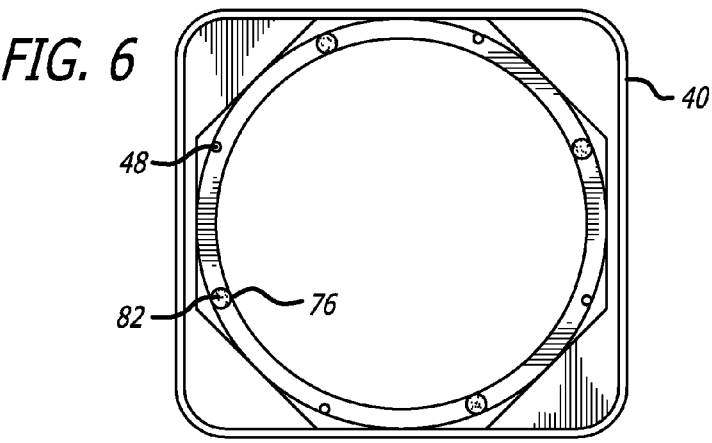
FIG. 6 is a plan view of the resilient stop plate coupled to the body of the camera module of FIG. 3.

FIG. 6 is a plan view showing the support plate 72 and elastic sheet material 82, which form a resilient stop plate assembly 70, coupled to the body 40 of the camera module. A second surface of the elastic sheet material opposite the first surface is in contact with the first datum surface 44 on the body 40. As shown in FIG. 3, there may be wells 42 in the first datum surface 44 on the body 40 to receive an adhesive that adheres to the elastic sheet material 82 to hold the resilient stop plate assembly 70 in place on the body 40. The resilient stop plate assembly 70 may be located in a recessed portion of the body 40 as shown. The recess may have chamfered edges to aid in locating the resilient stop plate assembly 70 in the recess.

Figure 7:
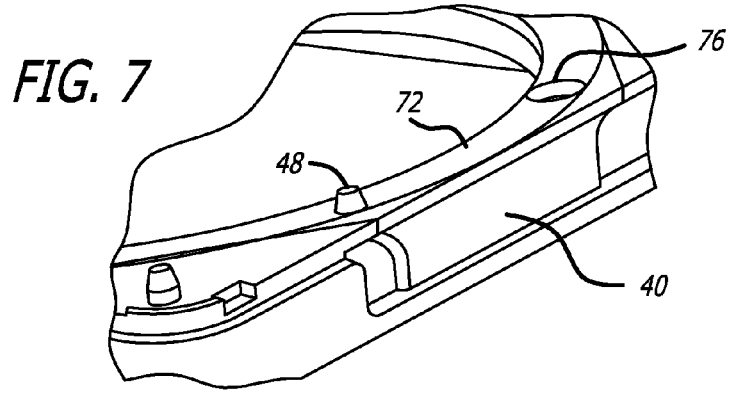
FIG. 7 is a pictorial view of the resilient stop plate placed over a stake.
Figure 8:
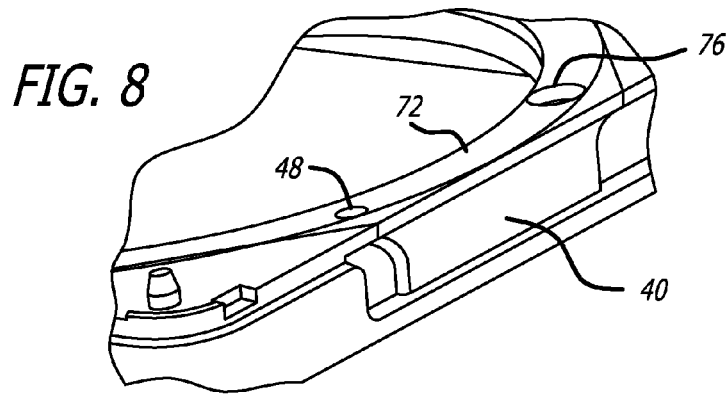
FIG. 8 is a pictorial view of the resilient stop plate of FIG. 8 with the stake deformed by heat staking to secure the resilient stop plate assembly to the body.
Figure 9:
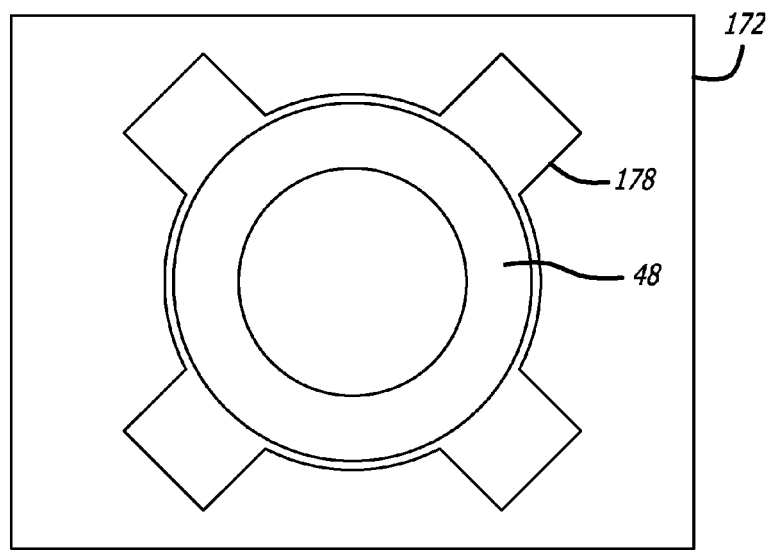
FIG. 9 is a plan view of an opening in the support plate that is shaped to prevent rotation of the support plate after heat staking.

As shown in FIGS. 3 and 6, there may be stakes 48 on the first datum surface 44 on the body 40 to secure the resilient stop plate assembly 70 to the body 40 by heat staking. The stakes 48 pass through corresponding openings 78, 88 in the support plate 72 and the elastic sheet 82. FIG. 7 shows a resilient stop plate assembly 70 placed over a stake 48. FIG. 8 shows the stake 48 deformed by heat staking to secure the resilient stop plate assembly 70 to the body 40. As shown in FIG. 9, in some embodiments the openings 178 in the support plate 172 are shaped to prevent rotation of the support plate after heat staking.

It may be desirable to use a viscoelastic material for the elastic sheet material. Viscoelastic materials have an elastic component and a viscous component. Purely elastic materials do not dissipate energy when a load is applied, then removed. However, a viscoelastic substance loses energy when a load is applied, then removed. The use of a viscoelastic material for the elastic sheet material may aid in damping the motion of the movable portion of the VCM when it lands on the elastic sheet. In particular, it may be desirable to use an anelastic material or one that is nearly anelastic. An anelastic material is a viscoelastic material that will fully recover to its original state on the removal of load.

Figure 10:
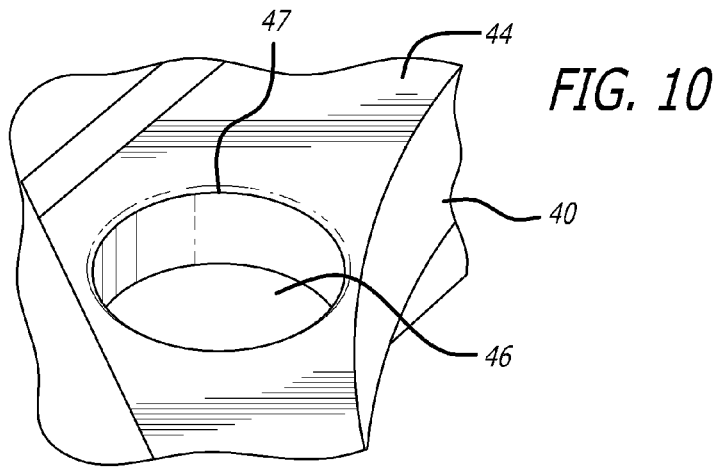
FIG. 10 is a pictorial view of a portion of the body of the camera module of FIG. 1 showing a recess in the first datum surface.

FIG. 10 is a pictorial view of a portion of the body 40 showing a recess 46 in the first datum surface 44. A filleted edge 47 may join the recess 46 to the first datum surface 44.

Figure 11:
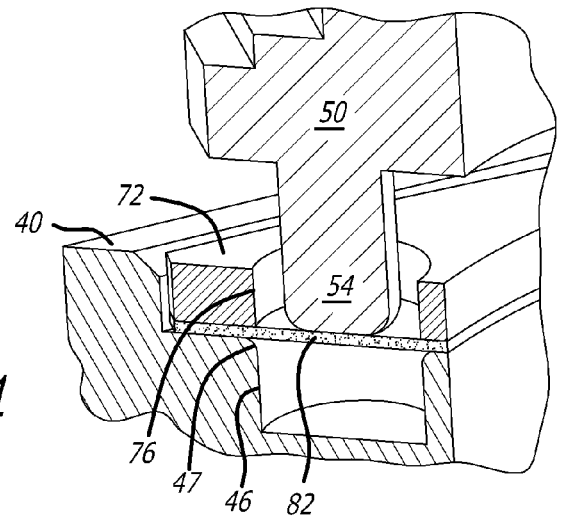
FIG. 11 is a pictorial view of a portion of the body of the camera module of FIG. 1 sectioned to show the recess with a portion of a lens assembly that includes a protrusion within a recesses in the first datum surface.

FIG. 11 is a pictorial view of a portion of the body 40 sectioned to show the recess 46 with a portion of a lens assembly 50 that includes one of the plurality of protrusions 54 arranged to fit within one of the like plurality of recesses 46 in the first datum surface 44. The support plate 72 and the elastic sheet 82 are shown supporting the protrusions 54 at a position above the first datum surface 44 established by the thickness of the elastic sheet. Since the thickness of an elastic sheet is highly uniform, the upper surface of the elastic sheet 82 provides a datum surface that is closely related to the first datum surface of the body 40.

Figure 12:
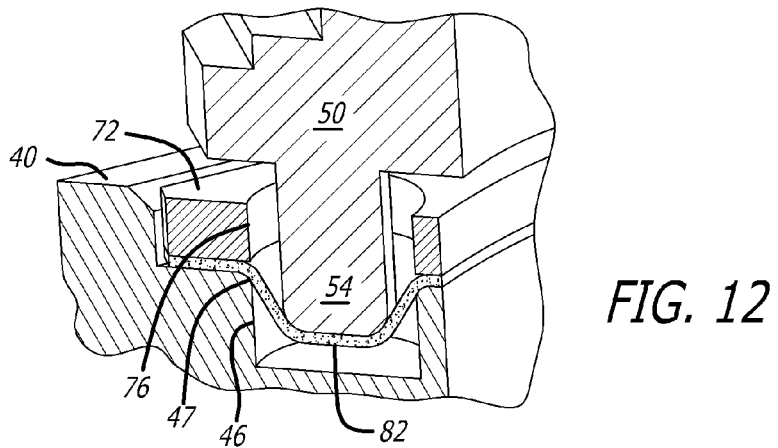
FIG. 12 is a pictorial view of the portion of the body shown in FIG. 11 with the protrusion deforming an elastic sheet.

FIG. 12 is a pictorial view of a portion of the body 40 sectioned to show the recess 46 with the protrusion 54 deforming the elastic sheet 82 following an impact with the datum surface provided by the elastic sheet. The radius of the filleted edge 47 joining the recess 46 to the first datum surface 44 may be chosen to control the film deformation and damping properties.

A method of assembling a camera module using a resilient stop plate assembly 70 may include the following procedures:

Joining an image sensor 60 to a body 40 at a known distance from a first datum surface 44 on the body. The body includes a plurality of recesses 46 in the first datum surface 44.

Inserting a lens assembly 50 into a lens moving mechanism 10, 30. The lens assembly includes a plurality of protrusions 54 that define a second datum surface. The plurality of protrusions 54 are arranged to fit within the like plurality of recesses 46 in the first datum surface 44.

Forming a support plate 72 from a rigid material. The support plate has a central opening 74 that provides an optical path between the lens assembly 50 on a first side of the support plate and the image sensor 60 on an opposite side of the support plate. The support plate further has a plurality of peripheral openings 76 arranged to expose the like plurality of recesses 46 in the first datum surface 44.

Coupling an elastic sheet material 82 to the support plate 72 with a first surface of the elastic sheet material in contact with a first surface of the support plate.

Cutting away the elastic sheet material 84 that covers the central opening 74 of the support plate 72.

Coupling the support plate 72 and elastic sheet material 82 to the body 40 with a second surface of the elastic sheet material that is opposite the first surface of the elastic sheet material in contact with the first datum surface on the body.

The stop plate assembly 70 provides a layer of film placed in base of a VCM that provides viscoelastic damping during impact. The film acts as a datum surface for the lens carrier and displaces upon contact; decreasing impulse energy of the impact. Energy is dissipated during deformation, reducing amount available for acoustic noise. The mechanism is similar to a trampoline.

The film layer 82 may be adhesively bonded to a metal stiffener 72. The bonded stop plate assembly 70 is placed into the VCM base 40, typically a polymer material. The film and metal stop plate assembly 70 is then permanently attached to the base, such as by gluing and/or heat-staking. Glue between the base and film may be placed in wells in the base before assembly.

The base 40 has a cavity for the metal plate and film 70. The base may have wells 42 for glue to be inserted. Heat stakes 48 can be used to firmly secure the metal plate 72. Cavities 46 for the datums 54 provide clearance and avoid contact during displacement. Existing VCM base designs are maintained to allow for easy adoption and preserve sealing mechanisms.

The elastic sheet used for the film 82 is thin, perhaps on the order of about 25 microns (0.025 mm, 0.001 in.) and may be made of a material similar to silicon. The film may exhibit viscoelastic damping properties and a portion of the energy of an impact is dissipated while the rest is returned.

The film 82 may be glued to a surface of the metal plate 72. The metal plate 72 holds the film 82 in place and acts as stiffener. The metal plate 72 aids in attachment of the film 72 to the base 40. The metal plate 72 can be stamped from sheet metal or etched. The metal plate 72 has heat stakes holes 78 and carrier datum holes 76. The metal plate 72 may be on the order of 100-150 microns (0.100-0.150 mm) thick.

The base 40 has cavities 46 to avoid interference with carrier datums 54. It is desirable to provide at least 70 microns (0.070 mm) of clearance to the datum 54 on each side. The cavity 46 may be molded without any floor or interior wall depending on required dimensions. The radius of a fillet 47 around an edge of the cavity 46 may control film deformation and damping properties. The recess in the base 40 may be chamfered to allow easy insertion of the stop plate assembly 70. If desired, the heat staking holes 178 in the metal plate 172 may be shaped to avoid rotary movement of the metal plate relative to the base 40.

An exemplary process of for assembling a stop plate assembly to a VCM base may be:

1) Metal plate stamped out or etched (Exterior/interior shape and holes for datums)
2) Glue applied to metal plate
3) Metal plate attached to film
4) Assembly is cut (holes for heat-staking and film cut to metal plate's outline)
5) Glue applied to divots in base
6) Stop plate assembly aligned and placed into base
7) Stop plate assembly heat staked into place Another exemplary process of for assembling a stop plate assembly to a VCM base may be:

1) Rigid plate molded from a plastic material (Exterior/interior shape and holes for datums)
2) Viscoelastic material is comolded with the rigid plate to provide a sheet of viscoelastic material over the holes for datums
3) Stop plate assembly aligned and placed into base
4) Stop plate assembly heat staked into place While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A camera module comprising:
    a body having a first datum surface with a plurality of recesses in the first datum surface, each of the plurality of recesses joined to the first datum surface by an edge that completely surrounds the recess;
    an image sensor coupled to the body at a known distance from the first datum surface;
    a movable lens mechanism having a fixed portion and a movable portion, the fixed portion coupled to the body, the movable portion including a lens assembly and a plurality of protrusions that define a second datum surface, each of the plurality of protrusions fitting within a corresponding one of the plurality of recesses in the first datum surface such that the second datum surface of the movable portion cannot contact the first datum surface of the body; and
    a resilient stop plate that includes an elastic sheet material that completely covers each of the plurality of recesses in the first datum surface, and extends over the edge of each of the plurality of recesses and onto the first datum surface such that the elastic sheet material provides a third datum surface at a known distance from the first datum surface that the second datum surface of the movable portion can contact.

2. The camera module of claim 1 wherein the resilient stop plate further includes a rigid support plate coupled to a first surface of the elastic sheet material opposite a second surface of the elastic sheet material, the second surface being in contact with the first datum surface.

3. The camera module of claim 1 wherein the resilient stop plate further includes a rigid support plate co-molded with the elastic sheet material.

4. The camera module of claim 2 wherein the resilient stop plate is coupled to the body by heat staking.

5. The camera module of claim 1 wherein the elastic sheet material is a viscoelastic material.

6. The camera module of claim 1 wherein the edge that joins the recess to the first datum surface is filleted.

7. The camera module of claim 1 wherein the movable lens mechanism further includes spring that holds the movable portion of the movable lens mechanism with the plurality of protrusions in contact with the resilient stop plate when the movable lens mechanism is unpowered.

8. A method of assembling a camera module, the method comprising:
    joining an image sensor to a body at a known distance from a first datum surface on the body, the body including a plurality of recesses in the first datum surface, each of the plurality of recesses joined to the first datum surface by an edge that completely surrounds the recess;
    inserting a lens assembly into a lens moving mechanism, the lens assembly including a plurality of protrusions that define a second datum surface, each of the plurality of protrusions arranged to fit within a corresponding one of plurality of recesses in the first datum surface such that the second datum surface of the movable portion cannot contact the first datum surface of the body;
    forming a stop plate assembly that covers the plurality of recesses in the first datum surface with an elastic sheet material;
    coupling the stop plate assembly to the body such that the elastic sheet material completely covers each of the plurality of recesses in the first datum surface, and extends over the edge of each of the plurality of recesses and onto the first datum surface such that the elastic sheet material provides a third datum surface at a known distance from the first datum surface that the second datum surface of the movable portion can contact; and
    coupling the lens moving mechanism to the body such that the second datum surface of the plurality of protrusions on the lens assembly are in contact with the elastic sheet material when the lens moving mechanism is unpowered.

9. The method of claim 8 wherein coupling the stop plate assembly to the body further comprises heat staking the stop plate assembly to the body.

10. The method of claim 8 wherein the elastic sheet material is a viscoelastic material.

11. The method of claim 8 further comprising filleting the edge of each of the plurality of recesses in the first datum surface that joins the recess to the first datum surface.

12. The method of claim 8 further comprising holding the second datum surface of the plurality of protrusions on the lens assembly in contact with the elastic sheet material with a spring when the lens moving mechanism is unpowered.

13. The method of claim 8 wherein forming a stop plate assembly further comprises:

forming a support plate from a rigid material, the support plate having a central opening that provides an optical path between the lens assembly on a first side of the support plate and the image sensor on an opposite side of the support plate and a plurality of peripheral openings arranged to expose the like plurality of recesses in the first datum surface;

coupling an elastic sheet material to the support plate with a first surface of the elastic sheet material in contact with a first surface of the support plate;

cutting away the elastic sheet material that covers the central opening of the support plate; and coupling the support plate and elastic sheet material to the body with a second surface of the elastic sheet material opposite the first surface in contact with the first datum surface on the body.

14. The method of claim 8 wherein forming a stop plate assembly further comprises co-molding a rigid support plate and the elastic sheet material.

* * * * *